(12) United States Patent
Yamat et al.

(10) Patent No.: US 10,564,920 B2
(45) Date of Patent: Feb. 18, 2020

(54) DYNAMIC SERVER-SIDE IMAGE SIZING FOR FIDELITY IMPROVEMENTS

(71) Applicant: MICROSOFT TECHNOLOGY LICENSING, LLC, Redmond, WA (US)

(72) Inventors: James Manahan Yamat, San Jose, CA (US); Harshal Ingole, San Jose, CA (US); Daniel M. Cheung, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/173,381

(22) Filed: Oct. 29, 2018

(65) Prior Publication Data

US 2019/0065135 A1   Feb. 28, 2019

Related U.S. Application Data

(63) Continuation of application No. 15/289,808, filed on Oct. 10, 2016, now Pat. No. 10,114,602, which is a
(Continued)

(51) Int. Cl.
*G06F 17/00* (2019.01)
*G06F 3/14* (2006.01)
(Continued)

(52) U.S. Cl.
CPC ........ *G06F 3/1454* (2013.01); *G06F 16/9577* (2019.01); *G06F 17/211* (2013.01);
(Continued)

(58) Field of Classification Search
CPC ............. G06F 3/1454; G06F 16/9577; G06F 17/2247; G06F 17/212; G06F 17/211;
(Continued)

(56) References Cited

U.S. PATENT DOCUMENTS

| 5,650,861 A | 7/1997 | Nakajima |
| 6,167,410 A | 12/2000 | Imamura |

(Continued)

OTHER PUBLICATIONS

Nijdam, et al., "A Context-Aware Adaptive Rendering System for User-Centric Pervasive Computing Environments", In 15th IEEE Mediterranean Electrotechnical Conference, Apr. 26, 2010, 6 pages.
(Continued)

*Primary Examiner* — Laurie A Ries
(74) *Attorney, Agent, or Firm* — Merchant & Gould P.C.

(57) ABSTRACT

Dynamically-generated images sized according to a requesting web client application display resolution are provided. The client application may calculate a target display resolution and pass the target display resolution as an input parameter with a request to a server for application content. The server may use the desired size input parameter to determine an optimal image size for the target display resolution. The server may render the application content as one or more images to the optimal image size and send the rendered image(s) to the client application. A determination may be made by the client application to display the image(s) at the size received or to scale the server-provided image(s). If the available area in the client application pane changes, the client application may recalculate the target display resolution and issue a new request to the server with the new target display resolution as the desired size input parameter.

20 Claims, 8 Drawing Sheets

Related U.S. Application Data continuation of application No. 13/550,259, filed on Jul. 16, 2012, now Pat. No. 9,465,572.

(60) Provisional application No. 61/557,711, filed on Nov. 9, 2011.

(51) Int. Cl.
| | | |
|---|---|---|
| *G06F 17/21* | (2006.01) | |
| *G06F 16/957* | (2019.01) | |
| *G06F 17/22* | (2006.01) | |

(52) U.S. Cl.
CPC ........ *G06F 17/212* (2013.01); *G06F 17/2247* (2013.01); *G09G 2370/022* (2013.01); *G09G 2370/027* (2013.01); *G09G 2370/042* (2013.01)

(58) Field of Classification Search
CPC ....... G09G 2370/042; G09G 2370/027; G09G 2370/022
See application file for complete search history.

(56) References Cited

U.S. PATENT DOCUMENTS

| | | | |
|---|---|---|---|
| 6,266,684 B1 | 7/2001 | Kraus et al. | |
| 6,431,448 B1 | 8/2002 | Nelson et al. | |
| 6,453,078 B2 | 9/2002 | Bubie et al. | |
| 6,563,517 B1 | 5/2003 | Bhagwat et al. | |
| 6,741,270 B1* | 5/2004 | Rzepkowski | G06F 3/0482 345/660 |
| 6,779,178 B1 | 8/2004 | Lloyd et al. | |
| 6,857,102 B1 | 2/2005 | Bickmore et al. | |
| 6,892,226 B1* | 5/2005 | Tso | G06Q 30/0207 709/218 |
| 6,978,418 B1* | 12/2005 | Bain | G06F 16/957 715/205 |
| 7,177,488 B2 | 2/2007 | Berkner et al. | |
| 7,350,155 B2* | 3/2008 | White | G06F 3/0236 715/800 |
| 7,574,653 B2* | 8/2009 | Croney | G06T 3/4092 345/428 |
| 7,620,271 B2 | 11/2009 | Takahashi | |
| 7,747,782 B2* | 6/2010 | Hunt | G06F 16/9577 709/246 |
| 7,788,596 B2* | 8/2010 | Iwabuchi | H04N 1/00244 715/800 |
| 7,809,807 B2* | 10/2010 | Tominaga | H04L 29/06 358/1.1 |
| 8,010,624 B2 | 8/2011 | Scott | |
| 8,209,623 B2 | 6/2012 | Barletta et al. | |
| 8,319,800 B2* | 11/2012 | Pan | G06O 30/0241 345/660 |
| 8,527,564 B2* | 9/2013 | Van Zwol | G06F 16/58 707/705 |
| 8,572,168 B2* | 10/2013 | Tahan | G06F 3/0481 709/203 |
| 8,608,559 B2 | 12/2013 | Atkinson | |
| 8,941,673 B2* | 1/2015 | Larsson | H04L 67/08 345/522 |
| 9,465,572 B2 | 10/2016 | Yamat et al. | |
| 10,114,602 B2 | 10/2018 | Yamat | |
| 2002/0040374 A1* | 4/2002 | Kent | G06Q 30/02 715/210 |
| 2002/0040375 A1 | 4/2002 | Simon | |
| 2002/0095439 A1 | 7/2002 | Long | |
| 2002/0131651 A1 | 9/2002 | Anantharamu | |
| 2003/0110234 A1* | 6/2003 | Egli | G06T 3/4092 709/217 |
| 2003/0167334 A1* | 9/2003 | Butler | H04L 29/06 709/227 |
| 2003/0197894 A1 | 10/2003 | Miyamoto | |
| 2004/0109197 A1 | 6/2004 | Gardaz et al. | |
| 2004/0183828 A1 | 9/2004 | Nichogi et al. | |
| 2005/0055636 A1 | 3/2005 | Graves | |
| 2005/0210380 A1* | 9/2005 | Kramer | G06F 3/04845 715/244 |
| 2006/0050973 A1* | 3/2006 | Ishikawa | H04N 21/234327 382/232 |
| 2006/0197964 A1 | 9/2006 | Kasuga | |
| 2006/0256130 A1* | 11/2006 | Gonzalez | G06F 16/958 345/619 |
| 2007/0168413 A1 | 7/2007 | Barletta et al. | |
| 2007/0250788 A1 | 10/2007 | Rigolet | |
| 2007/0283247 A1 | 12/2007 | Brenneman et al. | |
| 2008/0123138 A1 | 5/2008 | Banerjee | |
| 2008/0196076 A1 | 8/2008 | Shatz | |
| 2008/0276178 A1 | 11/2008 | Fadell et al. | |
| 2009/0007019 A1* | 1/2009 | Kobayashi | H04N 1/00244 715/838 |
| 2009/0013244 A1 | 1/2009 | Cudich et al. | |
| 2009/0138817 A1 | 5/2009 | Oron et al. | |
| 2010/0046839 A1 | 2/2010 | Washida | |
| 2010/0115452 A1* | 5/2010 | Chabot | G06F 16/957 715/779 |
| 2010/0162126 A1 | 6/2010 | Donaldson | |
| 2010/0228880 A1 | 9/2010 | Hunt | |
| 2010/0242087 A1 | 9/2010 | Matsumoto | |
| 2010/0321410 A1 | 12/2010 | Jenks et al. | |
| 2011/0010629 A1* | 1/2011 | Castro | G06F 3/1462 715/732 |
| 2011/0047505 A1 | 2/2011 | Fillion et al. | |
| 2011/0138313 A1 | 6/2011 | Decker et al. | |
| 2011/0185040 A1 | 7/2011 | Schmidt | |
| 2011/0246904 A1 | 10/2011 | Pinto | |
| 2012/0011568 A1* | 1/2012 | Tahan | G06F 3/0481 726/4 |
| 2012/0045118 A1 | 2/2012 | Lu et al. | |
| 2012/0079416 A1 | 3/2012 | Fagans | |
| 2012/0110224 A1 | 5/2012 | Tanaka et al. | |
| 2012/0128239 A1 | 5/2012 | Goswami et al. | |
| 2012/0147954 A1* | 6/2012 | Kasai | H04N 21/2343 375/240.03 |
| 2012/0206771 A1 | 8/2012 | Cok | |
| 2012/0210356 A1 | 8/2012 | Kiok et al. | |
| 2012/0215572 A1* | 8/2012 | Schneur | G06Q 30/06 705/5 |
| 2012/0249567 A1* | 10/2012 | Bocirnea | G06F 3/14 345/581 |
| 2012/0278338 A1* | 11/2012 | Liao | G06F 16/951 707/748 |
| 2012/0303695 A1* | 11/2012 | Michel | H04W 4/18 709/203 |
| 2013/0162678 A1 | 6/2013 | Harris | |
| 2014/0250371 A1 | 9/2014 | Wabyick et al. | |
| 2019/0160700 A1* | 5/2019 | Witkin | B26D 5/007 |

OTHER PUBLICATIONS

"Non Final Office Action Issued in U.S. Appl. No. 13/550,259", dated Sep. 29, 2014, 19 Pages.

"Final Office Action Issued in U.S. Appl. No. 13/550,259", dated May 5, 2015, 20 Pages.

"Non Final Office Action Issued in U.S. Appl. No. 13/550,259", dated Nov. 5, 2015, 21 Pages.

"Notice of Allowance Issued in U.S. Appl. No. 13/550,259", dated Jun. 6, 2016, 5 Pages.

* cited by examiner

MOBILE COMPUTING DEVICE

DYNAMIC SERVER-SIDE IMAGE SIZING FOR FIDELITY IMPROVEMENTS

CROSS-REFERENCE TO RELATED APPLICATIONS

The present application is a continuation of U.S. patent application Ser. No. 15/289,808 filed Oct. 10, 2016, now U.S. Pat. No. 10,114,602, which is a continuation of U.S. patent application Ser. No. 13/550,259 filed Jul. 16, 2012 now U.S. Pat. No. 9,465,572, which claims priority to U.S. Provisional Patent Application No. 61/557,711 filed Nov. 9, 2011, the disclosures of which are hereby incorporated by reference in their entirety.

BACKGROUND

Various software applications offering functionalities for a specific task or a range of tasks (e.g., word processing applications, spreadsheet applications, database applications, slide presentation applications, drawing or computer-aided application programs, etc.) may be available to users via the web. Such applications may herein be referred to as web-based applications. Such web-based applications may offer functionalities similar to the functionalities that were once only available by computer programs executing locally on a personal computer or on a terminal in a local area network.

A web-based application may be hosted by one or more servers and accessible via a communications network such as the Internet. A user of a client computing device may access a web-based application by connecting to a server hosting the web-based application with a client application running in a web browser application (herein referred to as a web client application) executing on the client computing device. The web client application may connect to the server hosting the web-based application and may download the web application's interface and data associated with the application to the client computing device. In some cases, some of the functionality of the web-based application may be downloaded to the client computing device for local execution.

The user may enter information into the interface or manipulate information using the interface via the web client application. The information may be transmitted to the server for processing. The server may transmit the processed data back to the client computing device and/or may store the processed data in a computer-readable medium for subsequent access via the web-based application.

Currently, a web client application may rely on a server to generate images for the web client application to present to the user. These images may represent text, shapes, charts, tables, etc. The web client application may have an arbitrary client-side display resolution that may vary based on hardware and/or software configurations. As can be appreciated, this may create a challenge when attempting to display high quality images.

The client computing device may be one of various types of computing devices with varying sizes and types of displays. For example, one user may utilize a tablet computing device to access a web-based application while another user may utilize a desktop computer with a large monitor.

Currently, servers may send images to web client applications sized for one resolution. The web client application may then either perform client-side scaling of the images or display the images at the fixed size. If a web client application performs client-side scaling, this may result in image fidelity degradation. For example, if an image of a given resolution is scaled up to a display on a larger screen, the image may look less precise; for example, text may appear more blurry and less readable. If a web client application displays an image at the fixed size, this may result in wasted, empty space if the server-provided image is too small or may require scroll bars if the server-provided image is too large for the client.

It is with respect to these and other considerations that the present invention has been made.

SUMMARY

Embodiments of the present invention solve the above and other problems by calculating a target display resolution and passing the target display resolution as an input parameter with a request to a server for application content. According to embodiments, the server may use the desired size input parameter to determine an optimal image size for the target display resolution. The server may then render the application content as one or more images to the optimal image size and send the rendered image(s) to the web client application. A determination may be made by the web client application to display the image(s) at the size received or to scale the server-provided image(s). If the available area in the web client application pane changes, the web client application may recalculate the target display resolution and issue a new request to the server with the new target display resolution as the desired size input parameter.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIG. 2 is an illustration of an example screenshot of a browser application running a web client application displayed on a computing device;

DETAILED DESCRIPTION

Figure 1A:
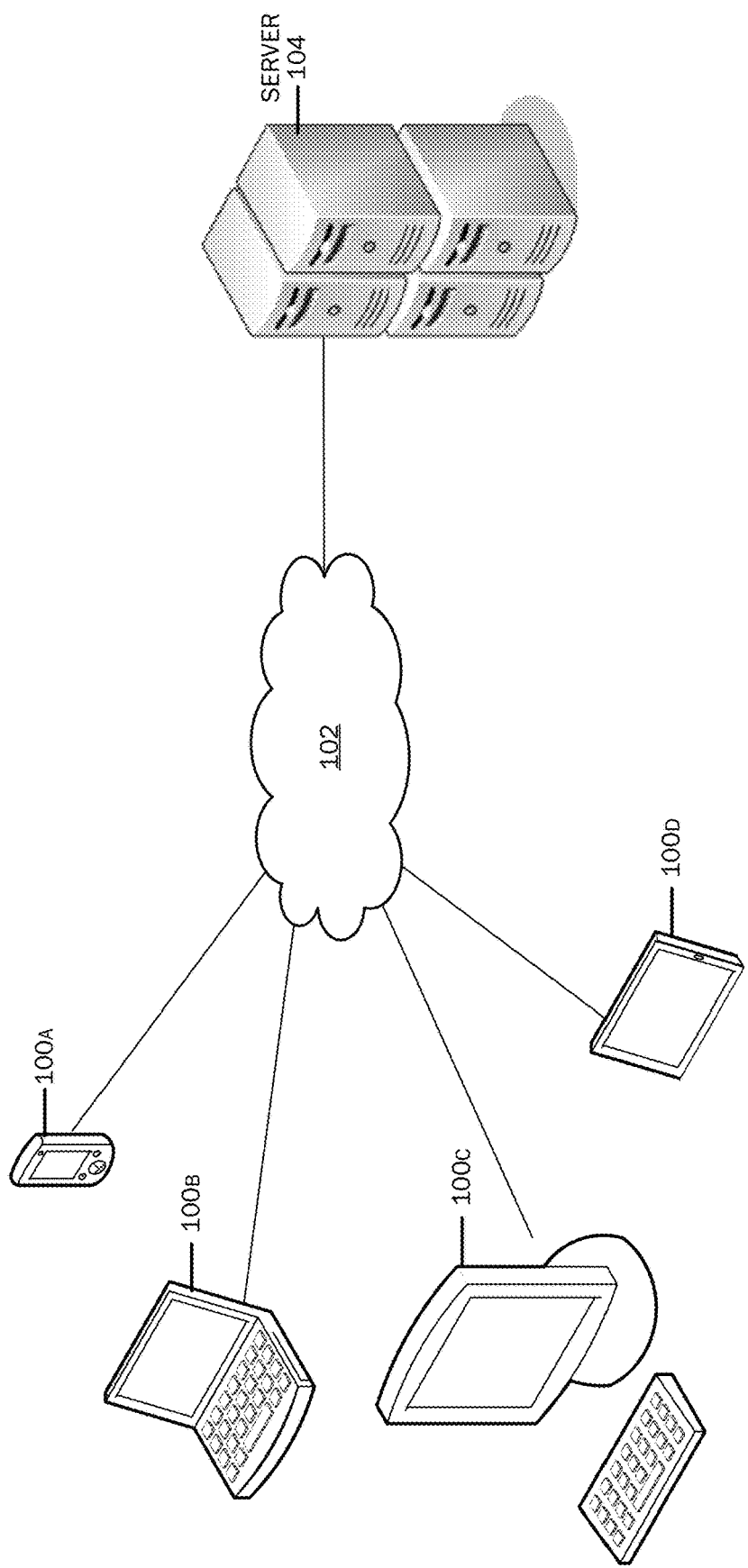
FIGS. 1A and 1B are diagrams of an illustrative system environment in which embodiments of the invention may be implemented.

As briefly described above, embodiments may calculate a target display resolution and pass the target display resolution as an input parameter with a request to a server for application content.

As described above, various users may have varying sizes of display screens with which to view content. For example, some users may utilize a tablet computing device while other users may utilize a computing device connected to a large monitor. Embodiments are directed to generating a display of content that is sized to a requesting device. The content that is rendered for a user may be customized for the particular user. For example, if a user launches a web-based application, such as a slide presentation web application, and selects to view a presentation or edit a presentation, the rendering via a server may be optimized (size of the rendering) for the particular client device being utilized by the user.

According to embodiments, the server may use the desired size input parameter to determine an optimal image size for the target display resolution. The server may render the application content as one or more images to the optimal image size and send the rendered image(s) to the web client application. If the available area in the web client application pane changes, the web client application may recalculate the target display resolution and issue a new request to the server with the new target display resolution as the desired size input parameter.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Figure 1B:
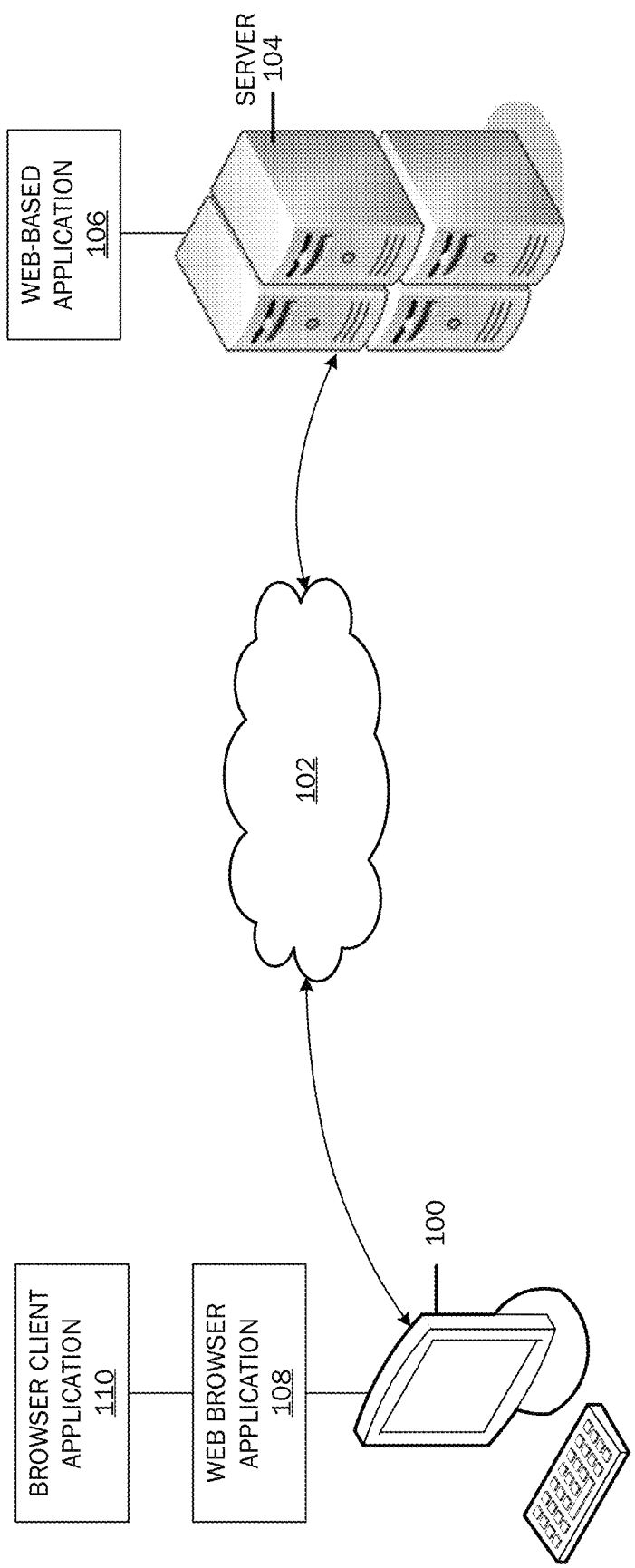

Referring now to the drawings, in which like numerals represent like elements, various embodiments will be described. FIGS. 1A and 1B are simplified diagrams of an illustrative system environment in which embodiments of the invention may be implemented. As illustrated in FIG. 1A, the computer system may include a communications network 102, client computing devices 100, and a server 104. The communications network 102 may include any suitable wired and/or wireless communications medium or media for exchanging data between a client computing device 100 and a server 104. For example, the communications network 102 may include the Internet. Client computing devices 100 may include any suitable computing device for sending and receiving data over a communications network 102. For example, client computing devices 100 may include, but is not limited to, a mobile phone 100A, a laptop computer 100B, a desktop personal computer 100C, a tablet computing device 100D, a personal digital assistant, a web-enabled television, etc. Server 104 may be an application server and may be any suitable computing device for sending data to and receiving data from one or more client computing devices 100 over a communications network 102. Although server 104 is shown as a single server, server 104 may be implemented as a network of computers sharing processing and storage demand.

As shown in FIG. 1B, client computing device 100, may utilize a web browser application 108 running a web client application 110 to connect to a server 104 hosting a web-based application 106. The web client application 110 may utilize a scripting language, such as JavaScript®.

Referring now to FIG. 2, a web client application 110 is shown running in a browser application 108 and displayed on a tablet computing device 100D. As illustrated, various user interface (UI) elements may be provided at the top of a browser application pane 202. For example, the web client application 110 may be the client-side application of a slide presentation web application 106 and may include an "edit" functionality control 208 and a "start slide show" functionality control 210 at the top of the browser application pane 202. Various UI elements may be provided at the bottom of the browser application pane 202. For example, the web client application 110 may include text indicating a current page or slide number 212, navigation controls 214, 216, and a "notes" functionality control 218. Other UI elements may be displayed, for example, a slide preview pane 220, may be provided at a side of the browser application pane 202. The available area 224 between the various UI elements 208-220 is the area within which application content 222, such as presentation content, may be displayed.

According to embodiments, a display resolution may be calculated for the amount of available area 224. According to embodiments, the dimensions of a current browser application pane 202 may be determined, and the space taken up by the UI elements 208-220 may be subtracted out, leaving a dimension of the available area 224. This dimension may be sent to the server 104 with a request for content 222. As described above, application content 222 may be rendered in the available area 224. Typically, the application content 222 may be smaller than the available area 224 because it may be displayed in such a way that is appears to sit within the available area 224 as illustrated in FIG. 2. Embodiments provide for minimizing the amount of available area 224 that a user will see to minimize empty space.

As described above, a web client application 110 may make a series of requests to a server 104. Scripting language, such as JavaScript® code, may run in the web client application 110 running in a web browser application 108, and may make requests to the server 104 for content 222. For example, the content 222 may be presentation content associated with a presentation application, such as PowerPoint® by Microsoft Corporation®.

Consider, for example, a user loads an application file on a server 104, such as a presentation file, for viewing. A scripting language (e.g., JavaScript®) may make a series of requests to the server 104. For example, a request may be made for an image for a first presentation slide. The server 104 may obtain the presentation file that may need to be converted into images that can be shown in a browser application pane 202. When making this conversion or rendering, the presentation file may be read and converted into one or more images, such as bitmap images. The term "image" may herein be used interchangeably with "application content." According to embodiments, the web client application 110 may determine a screen resolution or pane resolution that a current user session is running, and send the resolution as part of the request for the image 222. For example the request may be for a first slide and include a pane resolution of 800 pixels by 600 pixels. The server 104 may receive the resolution information and render an image 222 of the first slide customized for that resolution. The image 222 may be sent to the web client application 110 and the web client application may then display the image 222 in the browser application pane 202 for the user to see.

According to embodiments, a client-side pane dimension may be determined and sent as part of a request for content. Accordingly, rendering may be based on the request. The content shown to a user may be customized for the current user session. Accordingly, the image 222 may look sharp, as opposed to an image that may require browser-side scaling. If an image is provided at a resolution that does not fit a user's screen resolution, the text and images may appear blurry.

Figure 3:
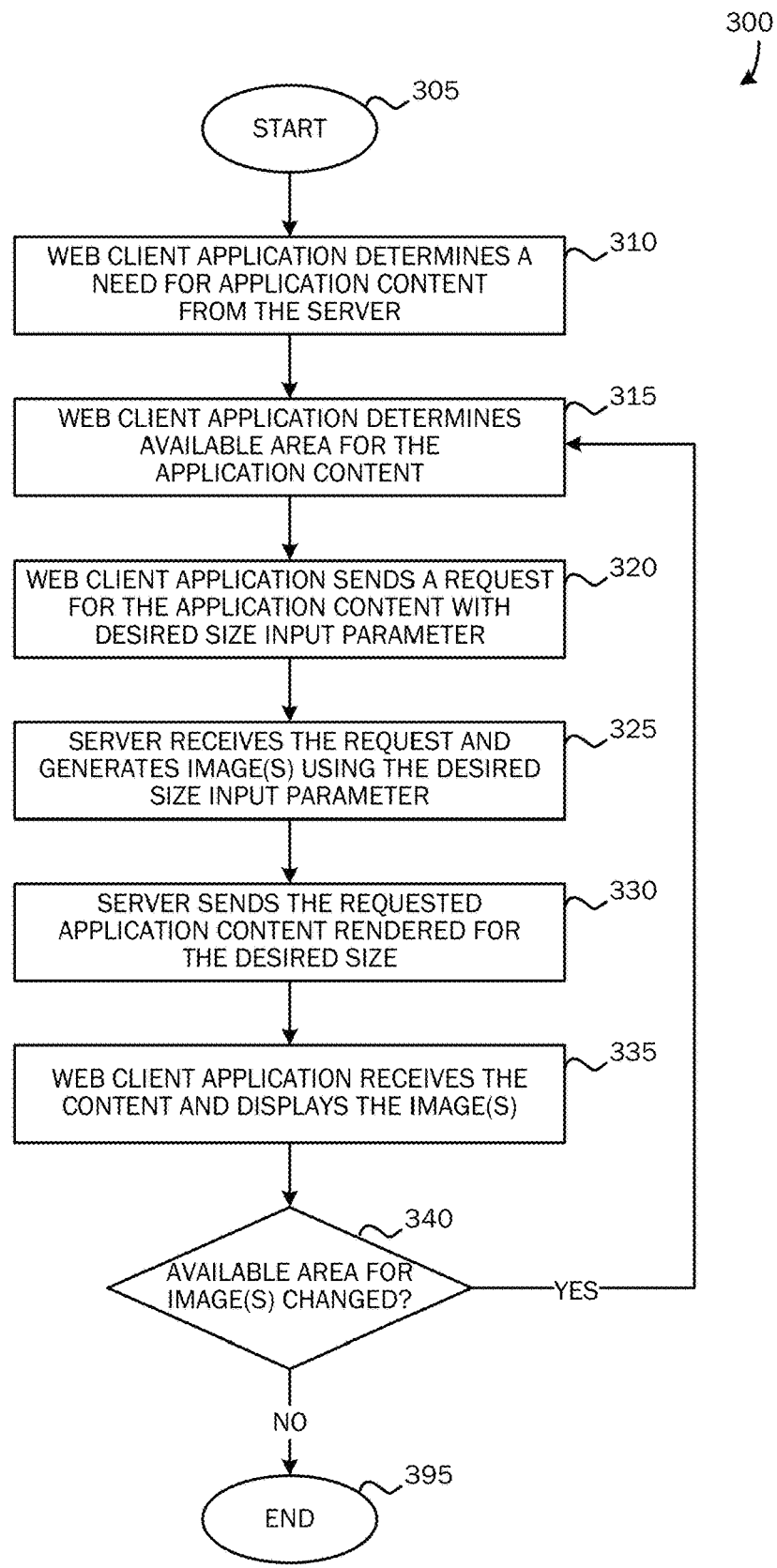
FIG. 3 is a flow chart of a method for calculating a target display resolution and passing the target display resolution as an input parameter with a request to a server for application content according to an embodiment.

FIG. 3 is a flow chart of a method 300 for calculating a display resolution input parameter to request application content 222 sized for a target display resolution of a web client application 110 according to embodiments. The method 300 starts at OPERATION 305 and proceeds to OPERATION 310 where a determination is made by the web client application 110 for a need of application content 222 in the format of one or more images from a server 104. For example, a need for application content 222 may be determined after receiving a request from a user for viewing content, such as a presentation slide.

The method 300 proceeds to OPERATION 315, where the web client application 110 calculates the available area 224 within which to display the application content 222. According to embodiments, the space taken up by UI elements 208-220 may be known by the web client application 110 and may be subtracted out of the size of the overall web client application pane. According to one embodiment, the available area 224 may be the entire size of an inline frame. The determined available area 224 dimension may herein be referred to as the desired size input parameter.

The method 300 proceeds to OPERATION 320, where the web client application 110 sends a request for application content 222. According to embodiments, the desired size input parameter may be sent to the server 104 as part of a request.

At OPERATION 325, the server 104 may receive the request including the desired size input parameter and may generate the requested application content 222 using the desired size input parameter to determine an optimal image size for the target display resolution. The server 104 may open the file containing the requested content 222, which may be a presentation file, and start rendering the content, for example, slides within the presentation. The server 104 may use the web client application-provided desired size input parameter to determine an optimal size for the target display resolution and dynamically generate images 222 that are sized appropriately.

According to one embodiment, when determining an optimal image size for the target display resolution, the optimal image size may be customized to the available area 224 in the browser application pane 202. According to another embodiment, a set of predetermined image sizes may be available. The desired size input parameter may be utilized to determine which of the predetermined image sizes may be optimal for the available area 224. For example, image sizes may be rendered at select, predetermined resolutions instead of the server 104 providing an infinite number of renderings.

Embodiments may provide a viewing functionality which allows users to view application content 222 and an editing functionality which allows users to edit application content 222. There may be differences between what is rendered between viewing and editing functionalities. According to one embodiment, application content 222 may be custom-tailored (size) for every requesting client device 100. As can be appreciated, each client device 100 might have a different browser pane 202 size. Accordingly, a consequence of customizing the rendering for each client device 100 is that the images 222 may not be able to be reused between users. Consider, for example, two users try to view the same presentation, but they have different pane sizes. The same image cannot be sent to both users, which may put a burden on server-side resources. According to an embodiment, a choice of a number of predetermined image sizes may be provided. The desired size input parameter may be utilized to determine the predetermined size that matches the current requesting client device's available area 224.

The method 300 proceeds to OPERATION 330, where the server 104 sends the requested application content 222 to the web client application 110, the application content 222 being rendered according to the desired size input parameter. At OPERATION 335, the web client application 110 receives the application content 222 and displays the content in the web browser pane 202.

According to embodiments, the web client application 110 may determine whether to perform client-side scaling of the server-provided images 222 or to display the server-provided images 222 at their actual size. Although client-side scaling may result in fidelity degradation, the amount of degradation may be dependent on the magnitude of difference between the server-provided image size and client target display resolution. Because the server 104 provides images 222 that may be closer in size to the client target display resolution, better image fidelity may be achieved. If the web client application 110 determines to display the images 222 at their actual size, this may result in displaying some empty space. However, since the server-provided image size may be closer to the client-side display resolution, the amount of empty space may be less (in other words, the images are relatively larger, and may take up more of the available display window).

Once the web client application 110 receives the images 222, a determination may be made to scale the images 222. If an image 222 is sent at a size of, for example, 16 pixels by 16 pixels, the web client application 110 can resize the image 222 larger or smaller. For example, the image may be rendered at 16×16 or 8×8, or it may be rendered at 24×24. As should be appreciated, when an image 222 is scaled, it may experience a loss in fidelity. If an image is scaled larger, it may look blurry. If an image is scaled smaller, it might lose some detail. In some cases, having empty space may be determined worse than having a slightly scaled image 222. Once the web client application 110 receives an image 222 from the server 104, a determination may be made whether it needs to scale the image so that it fits better in the area that it has available 224. For example, if the available area 224 is 5% larger than the image 222 sent, a determination may be made not to scale the image; however, if the available area 224 is 10% larger than the image 222 that is sent, then a determination may be made to scale the image.

According to embodiments, the web client application 110 may pass the aforementioned target display resolution as an input parameter to the server 104 when making the request for application content 222. The web client application 110 may make repeated requests. For example, as a user may view a document, which may be a presentation document. A portion of the content 222 may be sent at a given time, for example, one presentation slide. As the user goes through the content (e.g., slide show), the web client application 110 may make requests for more and more content (e.g., slides). Once a size at which to provide content is determined, the requests may include the desired size input parameter. The desired size input parameter for a particular rendering may be sent as part of each subsequent request that the browser makes.

According to embodiments, the web client application 110 may request a new target display resolution. At DECISION OPERATION 340, a determination may be made to determine if the available area 224 has changed. If it is determined that the available area 224 has changed, the method 200 may go back to OPERATION 315 and repeat OPERATIONS 315-340. The server 104 may generate new images 222 that are sized for the new available area 224. For example, a user may change the browser pane 202 size in various ways. The pane 202 may go from a small to a large pane by maximizing the pane, or may go from a large pane to a small pane by minimizing the pane, or the user may switch the pane to a different monitor with a different resolution. Any of these user actions may result in the available area changing. At that point, the web client application 110 may determine that the available area 224 has changed and may request the application content 222 rendered for the new area available. In response to the request, the server 104 may generate and send a new set of images 222 based on the new available area 224. According to an embodiment, each time a user changes the browser resolution or the browser pane 202 size, the web client application 110 may send a request to the server 104 with the new desired size input parameter requesting the server 104 to render images 222 for the new available area 224. According to embodiments, this may be a dynamic process: as the user changes the area available for content, the system responds to the changes. According to one embodiment, while the web client application 110 is waiting for a response from the server 104 with the resized image(s), the current image(s) 222 may be scaled to fit the new available area 224. Alternatively, the web client application 110 may display the current application content 222 at its current size until the resized image(s) are received. The method 300 ends at OPERATION 395.

Figure 4:
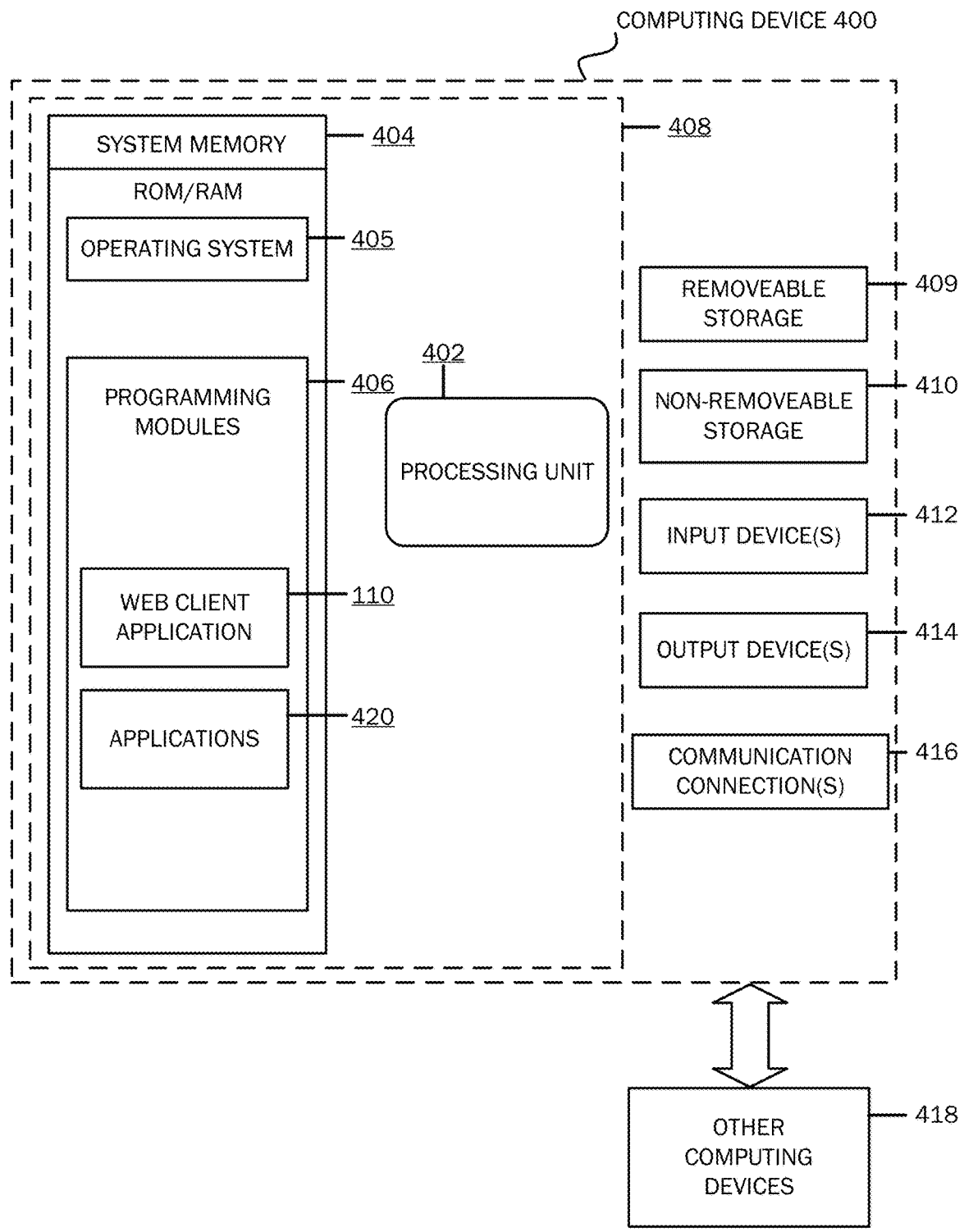
FIG. 4 is a block diagram illustrating example physical components of a computing device with which embodiments of the invention may be practiced.

The embodiments and functionalities described herein may operate via a multitude of computing systems including, without limitation, desktop computer systems 100C, wired and wireless computing systems, mobile computing systems (e.g., mobile telephones 100A, netbooks, tablet or slate type computers, such as tablet computing device 100D, notebook computers, and laptop computers 100B), handheld devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 4 through 6 and the associated descriptions provide a discussion of a variety of operating environments in which embodiments of the invention may be practiced. However, the devices and systems illustrated and discussed with respect to FIGS. 4 through 6 are for purposes of example and illustration and are not limiting of a vast number of computing device configurations that may be utilized for practicing embodiments of the invention, described herein.

FIG. 4 is a block diagram illustrating example physical components (i.e., hardware) of a computing device 400 with which embodiments of the invention may be practiced. The computing device components described below may be suitable for the computing devices described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 420. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406, such as web client application 110, may perform processes including, for example, one or more of the stages of the method 300. The aforementioned process is an example, and the processing unit 402 may perform other processes. Other program modules that may be used in accordance with embodiments of the present invention may include electronic mail and contacts applications, word processing applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, a gesture recognition device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 404, the removable storage device 409, and the non-removable storage device 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 400. Any such computer storage media may be part of the computing device 400.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
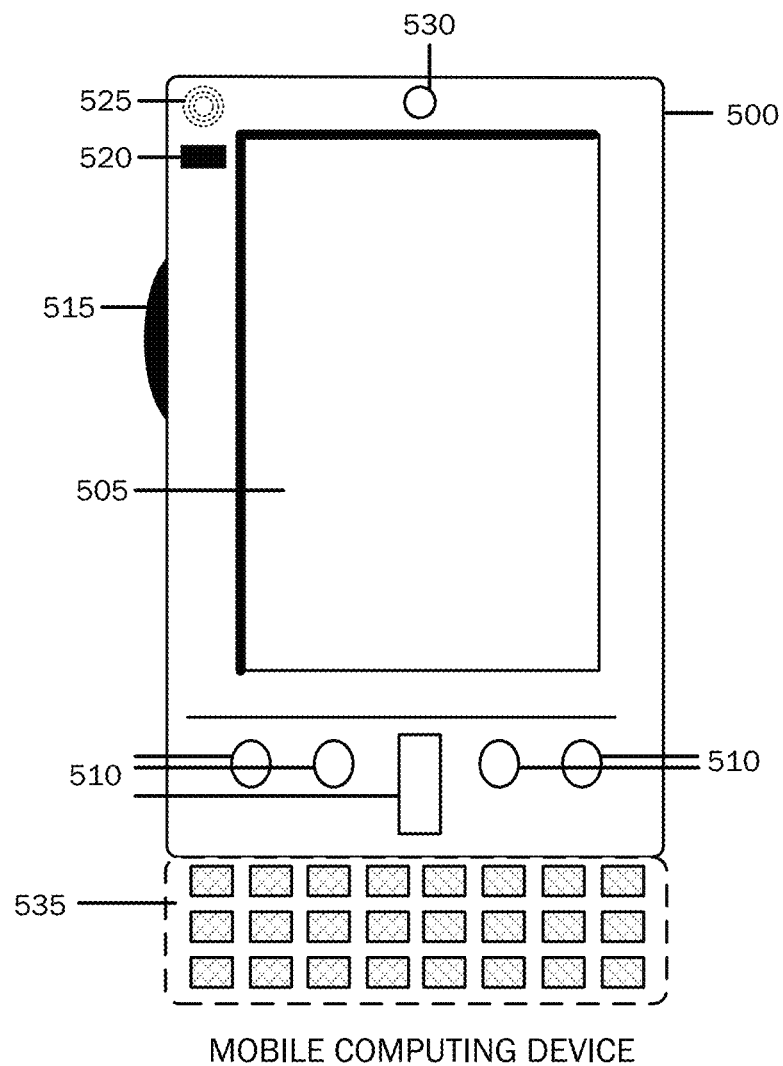
FIGS. 5A and 5B are simplified block diagrams of a mobile computing device with which embodiments of the present invention may be practiced.
Figure 5B:
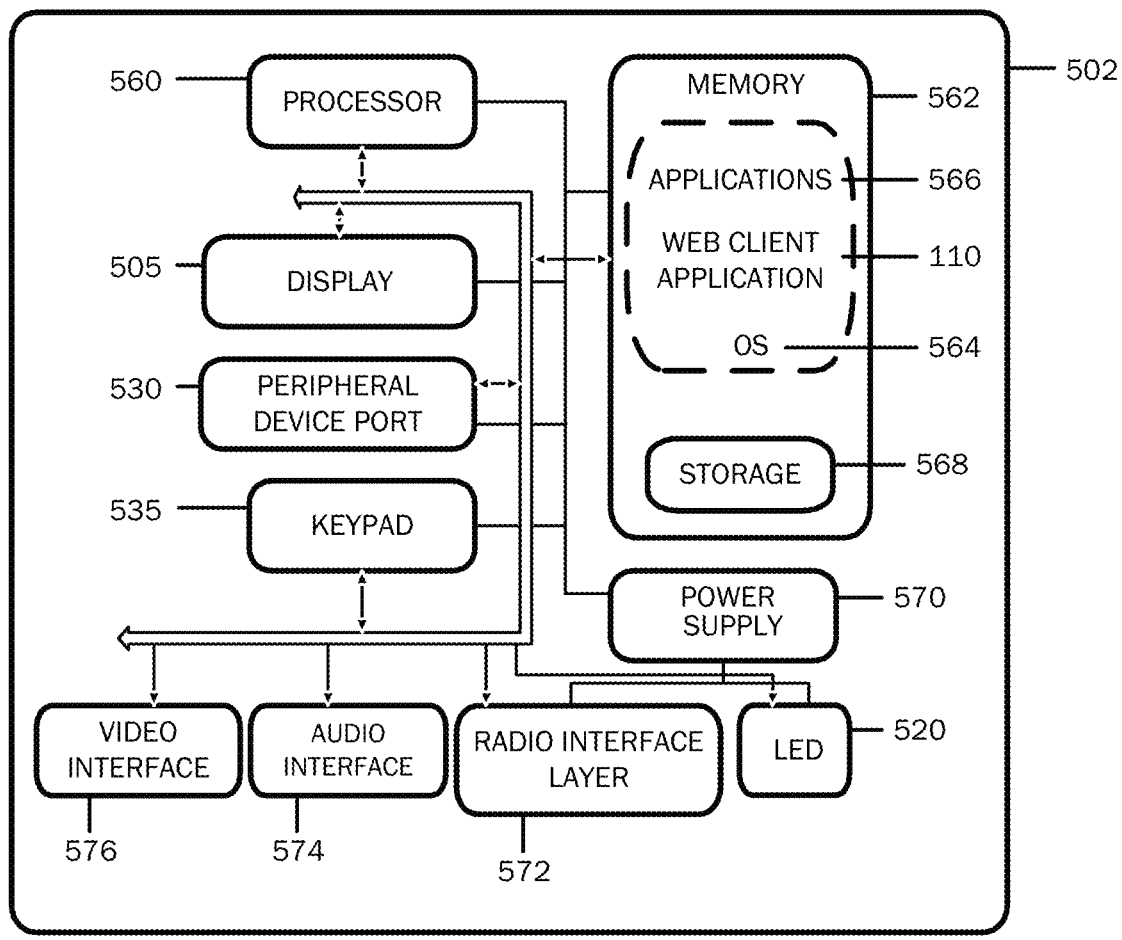
Figure 6:
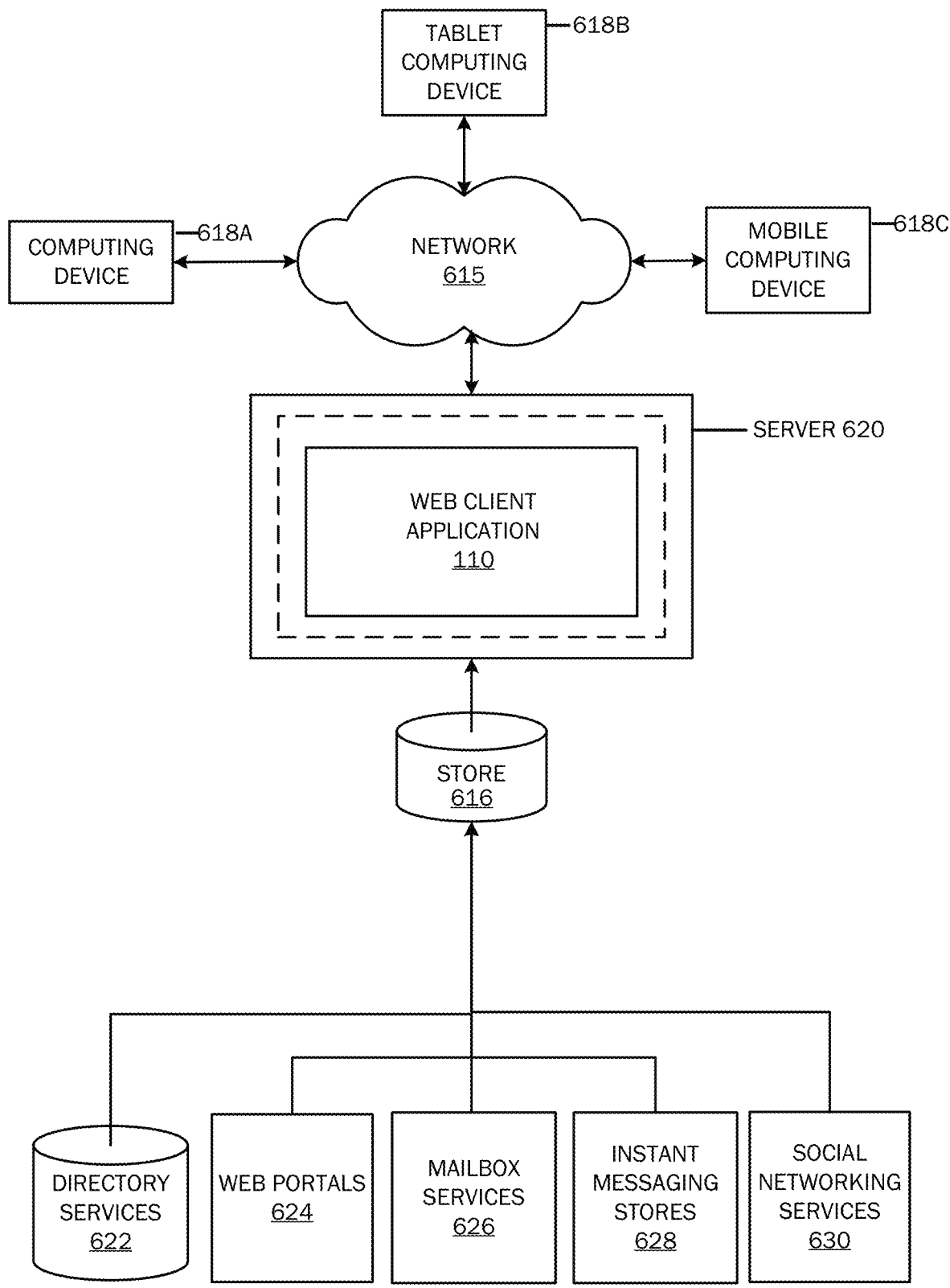
FIG. 6 is a simplified block diagram of a distributed computing system in which embodiments of the present invention may be practiced.

FIGS. 5A and 5B illustrate a mobile computing device 500, for example, a mobile telephone 100A, a smart phone, a tablet personal computer, such as tablet computing device 100D, a laptop computer 100B, and the like, with which embodiments of the invention may be practiced. With reference to FIG. 5A, an exemplary mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566, which may include web client application 110, may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world", via a communications carrier or service provider. Transmissions to and from the radio 572 are conducted under control of the operating system 564. In other words, communications received by the radio 572 may be disseminated to the application programs 566 via the operating system 564, and vice versa.

The radio 572 allows the system 502 to communicate with other computing devices, such as over a network. The radio 572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for calculating a target display resolution and passing the target display resolution as an input parameter with a request to a server for application content as described above. Content developed, interacted with or edited in association with the application may be stored in different communication channels or other storage types. For example, various documents may be stored using a directory service 622, a web portal 624, a mailbox service 626, an instant messaging store 628, or a social networking site 630. Web client application 110 may use any of these types of systems or the like for calculating a display resolution input parameter to determine an optimal size for a target display resolution, as described herein. A server 620 may provide the application 110 to clients. As one example, the server 620 may be a web server providing the application over the web. The server 620 may provide the application 110 over the web to clients through a network 615. By way of example, the client computing device 618 may be implemented as the computing device 618A,400 and embodied in a personal computer 100C, a tablet computing device 618B, 100D and/or a mobile computing device 618C,100A (e.g., a smart phone). Any of these embodiments of the client computing device 618 may obtain content from the store 616. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

We claim:

1. A method to provide one or more images sized according to a display area of a client device:
    calculating an available display area of the client device;
    sending a request for a set of one or more images from the client device to a server, the request including an image size based on the calculated available display area of the client device;
    receiving from the server the requested set of the one or more images,
    wherein the requested set of the one or more images is selected by the server from among a plurality of sets of the one or more images stored at the server, each set of the plurality of sets of the one or more images being associated with a unique pre-defined image size, and
    wherein the selection by the server from among the plurality of sets of the one or more images includes selecting the set having the unique image size determined to most optimally reflect the image size of the request; and
    displaying the received requested set of the one or more images in the display area of the client device.

2. The method of claim 1, further comprising:
    determining that the available display area of the client device has changed and calculating a new available display area of the client device;
    sending a new image size for the requested set of the one or more images from the client device to the server based on the calculated new available display area;
    receiving from the server a new version of the requested set of the one or more images,
    wherein the new version of the requested set of the one or more images is selected by the server from among the plurality of sets of the one or more images stored at the server, and
    wherein the selection of the new version of the requested set of the one or more images by the server from among the plurality of sets of the one or more images includes selecting the set having the unique image size determined to most optimally reflect the new image size; and
    displaying the new version of the received requested set of the one or more images in the new available display area of the client device.

3. The method of claim 2, wherein the set of one or more images comprises an individual still image.

4. The method of claim 2, wherein the set of one or more images comprises a plurality of images of a streaming video.

5. The method of claim 1, wherein calculating the available display area of the client device is performed by a web client application.

6. The method of claim 1, further comprising determining a resolution of the display area of the client device and wherein the request for the set of the one or more images additionally includes the determined resolution.

7. The method of claim 1, further comprising determining whether to perform client-side scaling of the received requested set of the one or more images.

8. A system to provide an image sized according to a display area of a client device:
    a communication medium that communicates with a server;
    a memory storing processor-executable instructions; and
    a processor in communication with the communication medium and the memory, wherein execution of the processor-executable instructions causes the processor to:
        calculate an available display area of the client device;
        send a request for a set of one or more images from the client device to a server, the request including an image size based on the calculated available display area of the client device;
        receive from the server the requested set of the one or more images,
        wherein the requested set of the one or more images is selected by the server from among a plurality of sets of the one or more images stored at the server, each set of the plurality of sets of the one or more images being associated with a unique pre-defined image size, and
        wherein the selection by the server from among the plurality of sets of the one or more images includes selecting the set having the unique image size determined to most optimally reflect the image size of the request; and
        display the received requested set of the one or more images in the display area of the client device.

9. The system of claim 8, wherein the processor is further caused to:
    determine that the available display area of the client device has changed and calculate a new available display area of the client device;
    send a new image size for the requested set of the one or more images from the client device to the server based on the calculated new available display area;
    receive from the server a new version of the requested set of the one or more images,
    wherein the new version of the requested set of the one or more images is selected by the server from among the plurality of sets of the one or more images stored at the server, and
    wherein the selection of the new version of the requested set of the one or more images by the server from among the plurality of sets of the one or more images includes selecting the set having the unique image size determined to most optimally reflect the new image size; and
    display the new version of the received requested set of the one or more images in the new available display area of the client device.

10. The system of claim 9, wherein the set of one or more images comprises an individual still image.

11. The system of claim 9, wherein the set of one or more images comprises a plurality of images of a streaming video.

12. The system of claim 8, wherein the calculation of the available display area of the client device is performed by a web client application.

13. The system of claim 8, wherein the processor is further caused to determine a resolution of the display area of the client device and wherein the request for the set of the one or more images additionally includes the determined resolution.

14. The system of claim 8, wherein the processor is further caused to perform client-side scaling of the received requested set of the one or more image.

15. A computer storage medium having computer-executable instructions to provide an image sized according to a display area of a client device, the computer-executable instructions comprising instructions to:

calculate an available display area of the client device;

send a request for a set of one or more images from the client device to a server, the request including an image size based on the calculated available display area of the client device;

receive from the server the requested set of the one or more images, wherein the requested set of the one or more images is selected by the server from among a plurality of sets of the one or more images stored at the server, each set of the plurality of sets of the one or more images being associated with a unique pre-defined image size, and wherein the selection by the server from among the plurality of sets of the one or more images includes selecting the set having the unique image size determined to most optimally reflect the image size of the request; and display the received requested set of the one or more images in the display area of the client device.

16. The computer storage medium of claim 15, wherein the computer-executable instructions further comprise instructions to:

determine that the available display area of the client device has changed and calculate a new available display area of the client device;

send a new image size for the requested set of the one or more images from the client device to the server based on the calculated new available display area;

receive from the server a new version of the requested set of the one or more images, wherein the new version of the requested set of the one or more images is selected by the server from among the plurality of sets of the one or more images stored at the server, and wherein the selection of the new version of the requested set of the one or more images by the server from among the plurality of sets of the one or more images includes selecting the set having the unique image size determined to most optimally reflect the new image size; and display the new version of the received requested set of the one or more images in the new available display area of the client device.

17. The computer storage medium of claim 16, wherein the set of the one or more images comprises an individual still image.

18. The computer storage medium of claim 16, wherein the set of the one or more images comprises a plurality of images of a streaming video.

19. The computer storage medium of claim 15, wherein the calculation of the available display area of the client device is performed by a web client application.

20. The computer storage medium of claim 15, wherein the computer-executable instructions further comprise instructions to determine a resolution of the display area of the client device and wherein the request for the set of the one or more images additionally includes the determined resolution.

* * * * *